United States Patent
Bellamy

[11] Patent Number: 6,081,942
[45] Date of Patent: Jul. 4, 2000

[54] PORTABLE, FOLDABLE TOILET APPARATUS FOR ATTACHMENT TO TREE TRUNKS

[76] Inventor: Duane H. Bellamy, 900 Broadwood Dr., Kingsport, Tenn. 37660

[21] Appl. No.: 09/303,638
[22] Filed: May 3, 1999
[51] Int. Cl.[7] ........................................ A47K 11/00
[52] U.S. Cl. .................... 4/460; 4/449; 108/152; 182/187; 297/17; 297/43; 297/44; 297/183.5; 297/440.1
[58] Field of Search .......................... 4/460, 449; 182/187, 182/188; 297/16.2, 17, 29, 43, 44, 183.5, 440.1; 108/152

[56] References Cited

U.S. PATENT DOCUMENTS

| | | |
|---|---|---|
| 1,306,041 | 6/1919 | Wittman . |
| 4,337,844 | 7/1982 | Hice, Sr. .................... 182/187 |
| 4,997,063 | 3/1991 | Bradley .................... 182/187 |
| 5,083,324 | 1/1992 | Strong . |
| 5,230,105 | 7/1993 | Watson . |
| 5,307,526 | 5/1994 | Appleby . |

*Primary Examiner*—Henry J. Recla
*Assistant Examiner*—Kathleen J. Prunner
*Attorney, Agent, or Firm*—Malcolm G. Dunn

[57] ABSTRACT

A portable, foldable toilet apparatus for attaching to a tree trunk, and including a tree trunk gripping frame section and a pair of longitudinal seat members pivotally connected to the gripping frame section for pivotal movement from a folded position within the gripping frame section to an open horizontal cantilevered position extending forwardly of the gripping frame section for supporting the weight of a person sitting thereon.

6 Claims, 7 Drawing Sheets

PORTABLE, FOLDABLE TOILET APPARATUS FOR ATTACHMENT TO TREE TRUNKS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE

Not Applicable

BACKGROUND OF THE INVENTION

The present invention is directed to a portable, foldable toilet apparatus that may be attached to tree trunks and be used by campers, outdoor persons and others in a wilderness environment where there are no plumbing facilities.

In the prior art, Wittman, U.S. Pat. No. 1,306,041 (1919), discloses a sanitary, portable toilet stool, which may be carried by automobile tourists or others for easy, quick set-up and knock-down upon making or breaking camp. This "camp toilet" comprises two board-like members, one being a front support or front board, which is hinged at its upper edge to the front edge of the other board member or seat member in which two toilet openings are provided. The hinge enables the two board members to form a compact body for convenient transport and storage, and also enables the two board members to be unfolded at right angles with respect to each other for use as a toilet seat for one or two persons at the same time. The front board or front support is provided along its upper edge at the center of the front board with a slot for receiving therethrough an anchor and seat supporting board. The anchor and seat supporting board extends along the underside surface of the seat member and through the slot provided in the front board for suitable connection, as by a flexible tie member, to any available tree trunk or other vertical standard. In this manner the anchor and seat supporting board serves to support the seat member in its open horizontal position and anchors the toilet to the tree trunk or other vertical standard to prevent tipping over of the structure, while the front support or front board, the bottom edge of which rests upon the ground, serves to support the weight of one or two persons sitting upon the seat member over the toilet openings.

The Strong patent, U.S. Pat. No. 5,083,324 (1992), also discloses a portable collapsible toilet seat for use in wilderness areas. The seat member, which is a metal stamping in the configuration of a conventional toilet seat and made from aluminum for lightness, is directly connected to the trunk of a tree for partial support of the toilet seat by a clamp mechanism carried at the rear edge of the seat member. The clamp mechanism includes a steel plate, the rear edge of which is concave to conform to the contour of a tree and is also serrated to penetrate the bark of the tree to hold the plate and thus the toilet seat at a desired level above the ground. Flexible straps, including a buckle structure, are attached to the steel plate for placing around the tree trunk and a manually-operated strap tensioner element serves to cause the serrated edges of the steel plate to dig or bite into the tree bark so as to anchor the seat member to the tree trunk. A foldable leg structure, the bottom edge of which is designed to rest upon the ground and provide the remaining support for the toilet seat, is pivotally connected to the undersurface of the seat member at its front edge so as to support the seat member at its rear edge by a diagonally extending foldable brace structure, and also to support the seat member near its front edge. The leg structure can be folded against the undersurface of the seat member for compact transport and storage. This toilet apparatus is designed to support in seated position one person at a time.

The Watson patent, U.S. Pat. No. 5,230,105 (1993), discloses a portable toilet seat and stand for wilderness camping. This patent discloses two seat bars, which serve the function of a toilet seat; two cross pieces, which connect as an assembly the seat bars at the forward and rearward ends thereof and also determine the spacing between the seat bars; four leg poles, which connect at their respective upper ends to the assembly of the two seat bars and the two cross-pieces, and connect at their respective lower ends to two longitudinal feet that are designed to rest upon the ground and also have sufficient surface area to prevent the toilet unit from sinking into the soft ground. The toilet unit is designed to rest upon the ground for support of one person at a time using the unit. The whole structure of this toilet unit is designed to be completely assembled from or disassembled into their individual parts so that the parts may be bundled together in a very small space and placed in a stuff bag having a draw cord. Watson discloses that the proper use of his invention will keep exposed parts of the human body well above ground level and substantially reduce the risk of acquiring a deer tick, which otherwise may cause Lyme disease.

The Appleby patent, U.S. Pat. No. 5,307,526 (1994), discloses a hammock style campers' toilet seat designed to be used in a wilderness area and strung between two trees for use by campers. The toilet seat is formed of flexible material and has a toilet opening, and has a stiffener ring having a greater stiffness than the toilet opening to lend stiffness and support to the seat about the toilet opening. The stiffener ring is sufficiently resilient so that the toilet seat may be rolled up to a compact form. A rope is tied to each end of the toilet seat and the other end of each rope is tied to a separate tree. The height of the tied connection to the trees has to be of sufficient height to allow some stretch of the ropes due to the weight of the person sitting upon the toilet seat so that the person may remain sufficiently elevated above the ground when using the toilet seat.

An object of applicant's invention is to provide a toilet apparatus for use in wilderness areas and that may be readily attached to and detached from a suitable sized tree trunk and at a sufficient height above the ground so as to enable the person to rest his or her feet upon the ground while sitting upon the toilet apparatus, but still be sufficiently elevated so as to keep exposed parts of the human body well above ground level and reduce the risk of acquiring a deer tick.

Another object of the invention is to provide a toilet apparatus that may be readily attached to a suitable sized tree trunk in such manner as not to cause any damage to the tree trunk.

A further object of the invention is to provide a toilet apparatus that is simply constructed to be folded into a compact structure for transport and storage, as well as to have a minimum amount of surface area so as to be easily cleaned.

A still further object of the invention is to provide a toilet apparatus wherein the longitudinal seat members forming the toilet seat upon which a person is to sit may be readily adjustable laterally with respect to each other to accommodate children as well as different sizes of adult persons.

BRIEF SUMMARY OF THE INVENTION

The present invention, therefore, is directed to a portable, foldable toilet apparatus for attaching to a tree trunk. The toilet apparatus has a tree trunk gripping section including a) a parallel pair of spaced longitudinal side members having forward and rearward end portions; b) a removable back bar connected to and between the rearward end portions of the longitudinal side members for engaging against the back side of a tree trunk; c) a front bar connected to and between the longitudinal side members intermediate of their length and spaced forwardly from the removable back bar for engaging against the front side of a tree trunk; and a pair of longitudinal seat members pivotally connected to the forward end portions of the longitudinal side members for pivotal movement from a folded position within the gripping frame section to an open horizontal position extending forwardly of the gripping frame section for supporting the weight of a person sitting thereon.

The gripping frame section of the toilet apparatus includes a first transverse member and a second transverse member connected to and between the longitudinal side members forward of the front bar and each being spaced from the other along the longitudinal side members. The first transverse member has pivotally connected thereto the pair of longitudinal seat members. The second transverse member is spaced forwardly of the first transverse member along the longitudinal side members and against which the pair of longitudinal seat members pivot into contact with and is supported in cantilevered manner in an open horizontal position by the second transverse member.

Each longitudinal seat member of the pair of longitudinal seat members is separately pivotal upon the first transverse member.

Each longitudinal seat member of the pair of longitudinal seat members is separately laterally adjustable along the length of the first transverse member with respect to the other longitudinal seat member to accommodate persons of different size.

Upon removal of the removable back bar of the toilet apparatus from the gripping frame section and upon removal of the gripping frame section from a tree trunk, the pair of longitudinal seat members is pivotally moveable from an open horizontal position into a folded position within the gripping frame section and into abutment on one side of the pair of longitudinal seat members against the front bar. Upon reattachment of the removable back bar to and between the longitudinal side members, the pair of longitudinal seat members is abutted on the other side of the longitudinal seat members against the removable back bar and is thereby locked into folded position for ready transport of the toilet apparatus.

The pair of longitudinal seat members is foldable upwardly against a tree trunk when the toilet apparatus is attached to the tree trunk and is not in use.

DETAILED DESCRIPTION OF THE INVENTION

Figure 1:
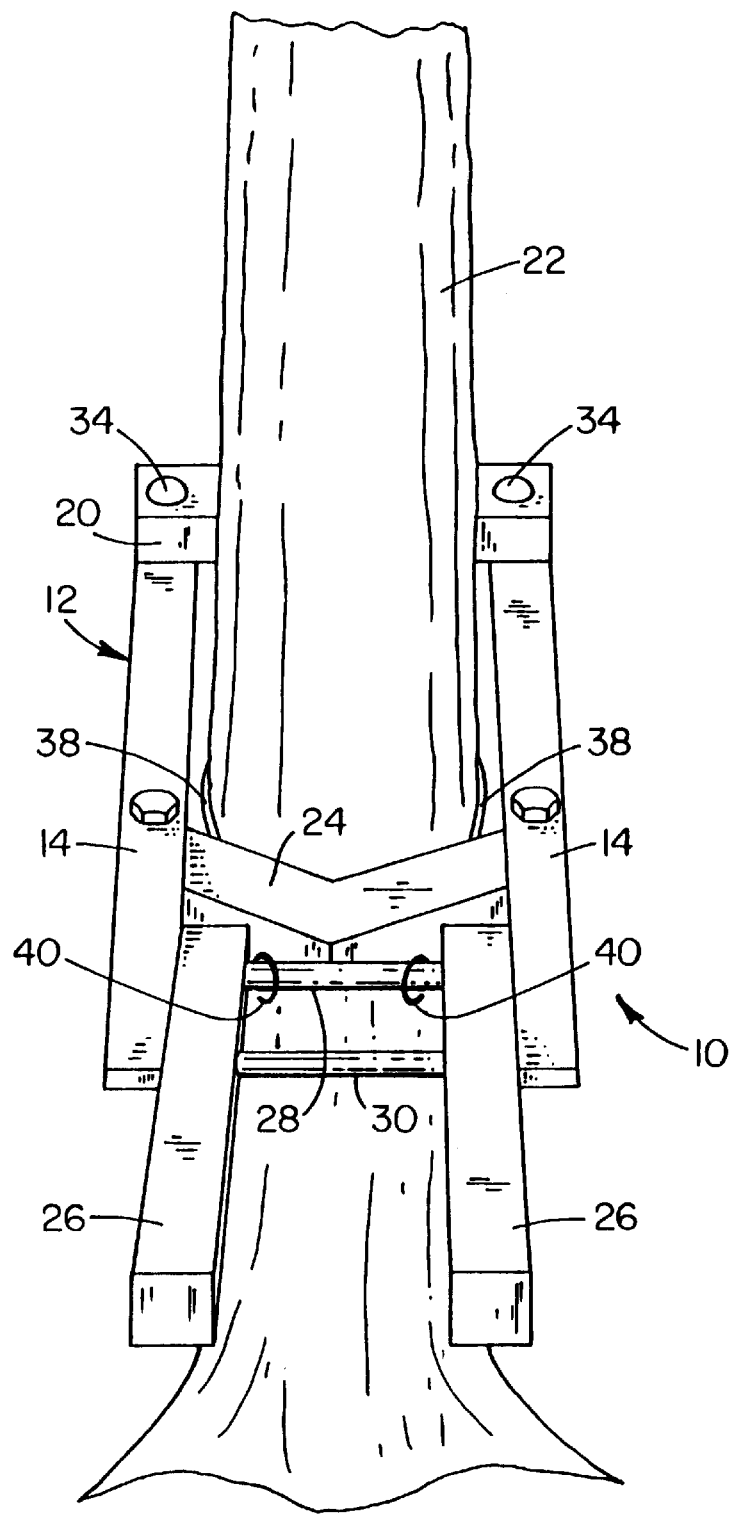
FIG. 1 is an isometric front view of the portable, foldable toilet apparatus of the invention and illustrating it as being attached to a tree trunk.

In reference to the drawings, the portable, foldable toilet apparatus of the invention is shown at 10.

The toilet apparatus 10 includes a gripping frame section 12, which includes a parallel pair of spaced longitudinal side members 14 having forward end portions 16 and rearward end portions 18. A removable back bar 20 is connected to and between the rearward end portions 18 of the longitudinal side members 14, and is designed to engage the back side of a tree trunk 22, as illustrated in FIGS. 1, 2 and 3.

A front bar 24 is connected to and between the longitudinal side members 14 intermediate of their length, and is also spaced forwardly from the removable back bar 20 for engaging against the front side of the tree trunk 22.

Figure 2:
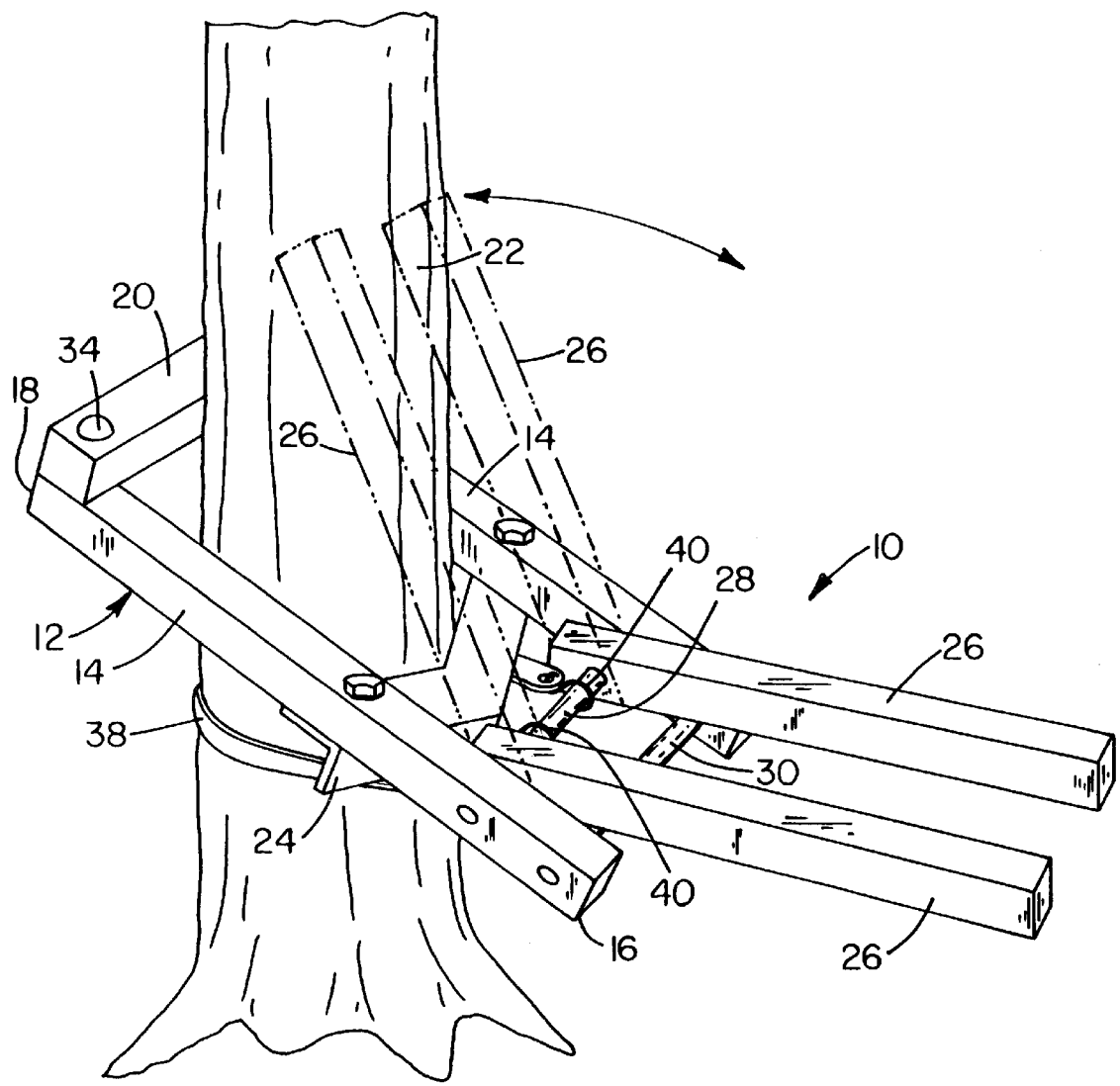
FIG. 2 is a side elevational view of the toilet apparatus shown in FIG. 1, and also shows in phantom lines how the pair of longitudinal seat members may be folded or pivoted upwardly against a tree trunk when the toilet apparatus is not being used.
Figure 3:
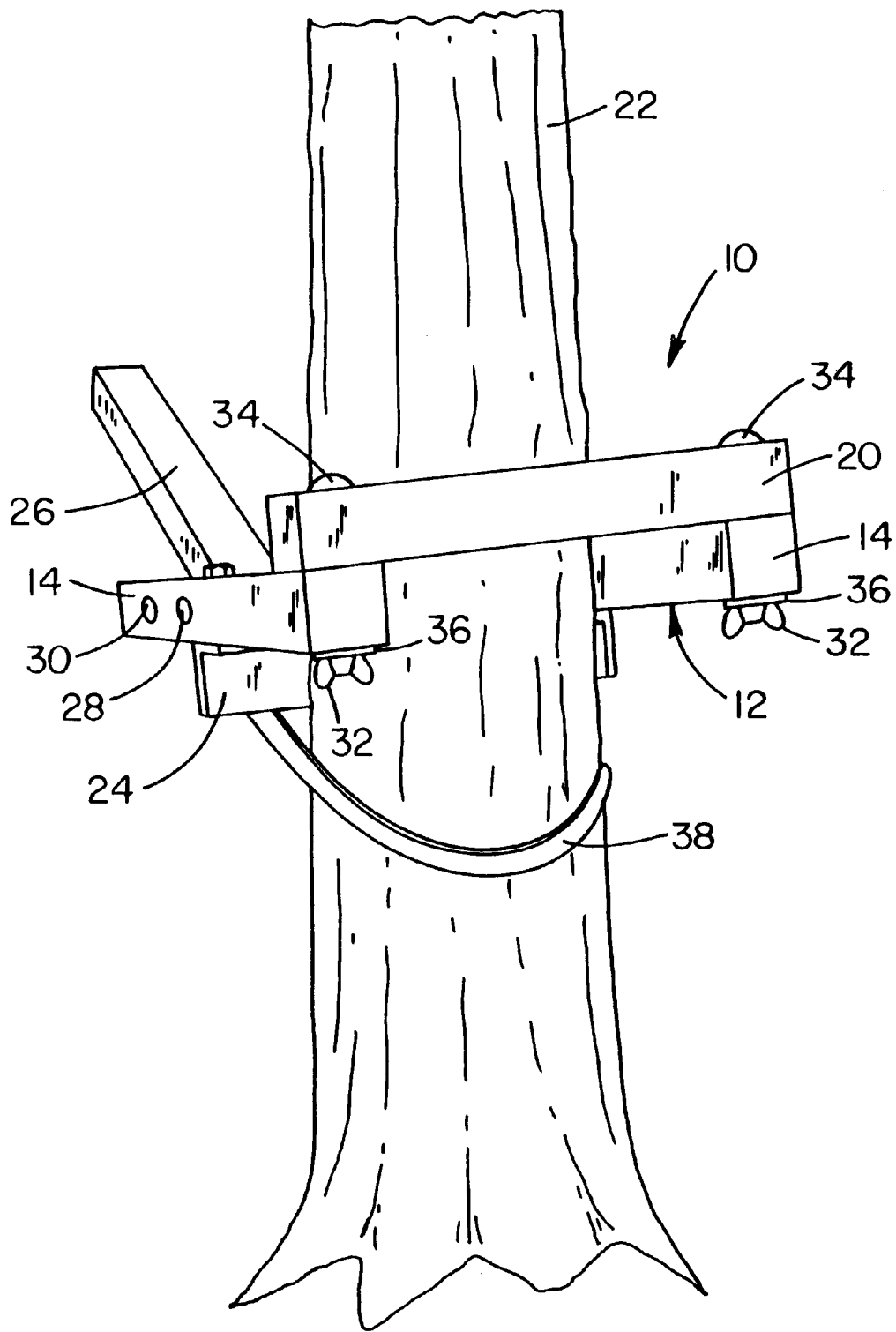
FIG. 3 is a rear view of the toilet apparatus shown in FIG. 1.
Figure 4:
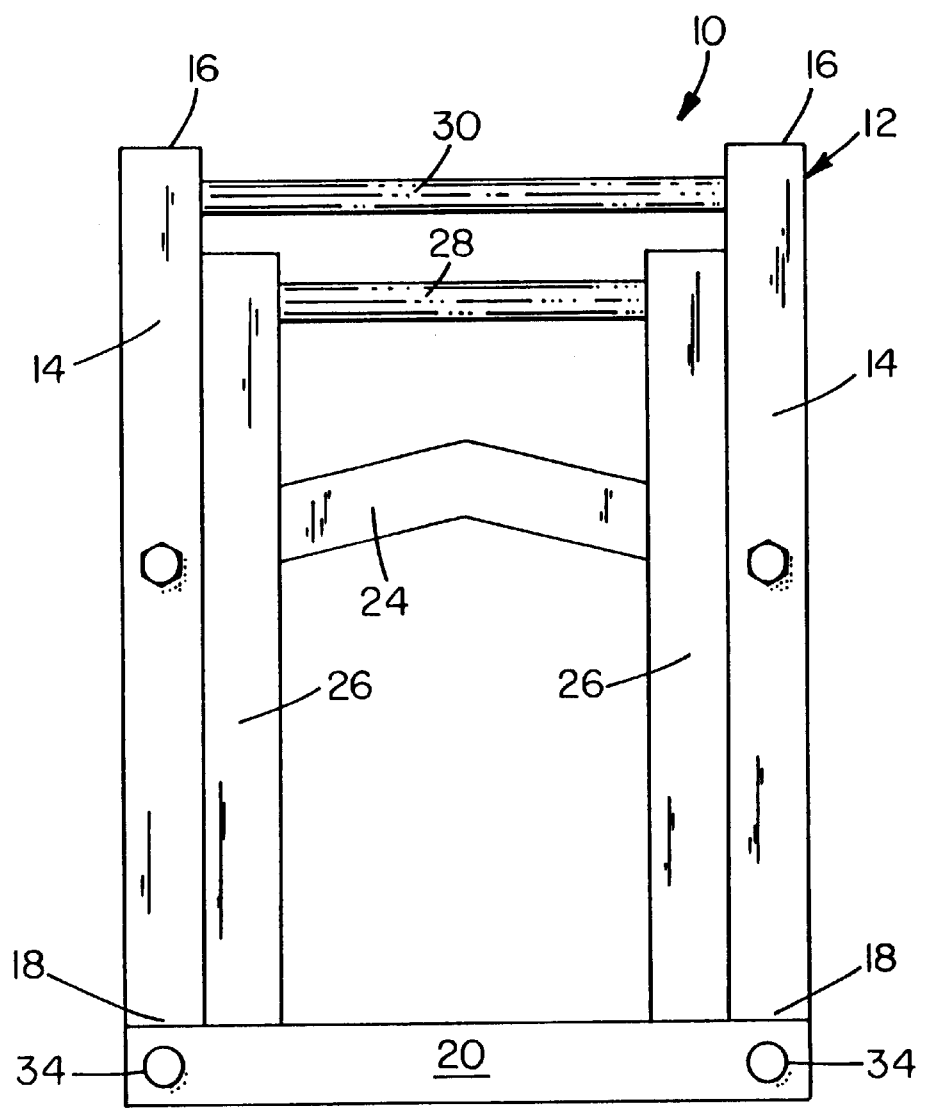
FIG. 4 is a top plan view of the toilet apparatus in folded position.
Figure 5:
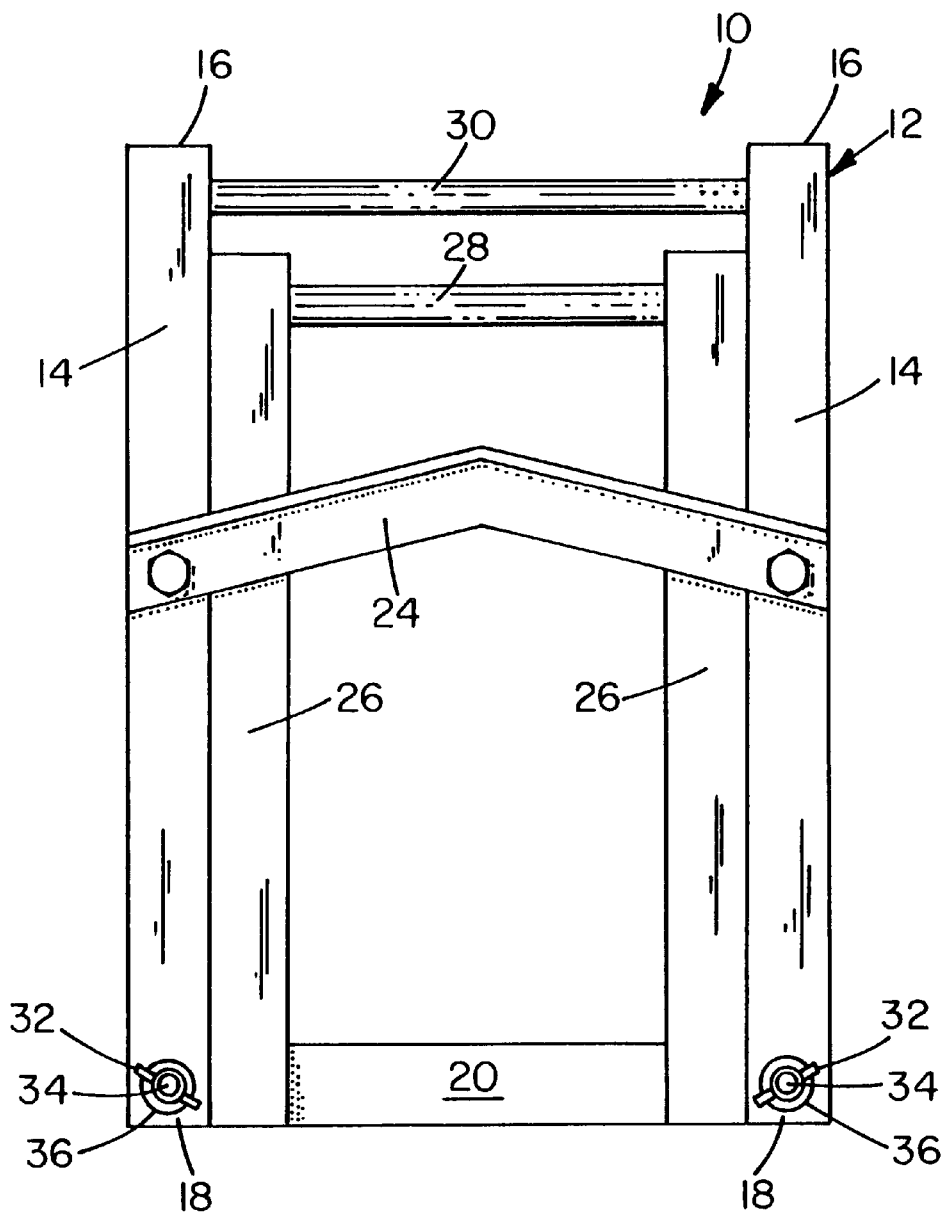
FIG. 5 is a bottom plan view of the toilet apparatus in folded position.

A pair of longitudinal seat members 26 is pivotally connected to the forward end portions 16 of the longitudinal side members 14 for pivotal movement from a folded position, as shown in FIGS. 4 and 5, to an open horizontal position, as shown in FIGS. 1, 2 and 3. This open horizontal position of the pair of longitudinal seat members 26 extends forwardly of the gripping frame section 12 and serves to support the weight of a person sitting thereon.

The gripping frame section 12 includes a first transverse member 28 and a second transverse member 30 connected to and between the pair of longitudinal side members 14 forward of the front bar 24. Each transverse member 28, 30, is spaced from the other along the pair of longitudinal side members.

The first transverse member 28 has pivotally connected thereto the pair of longitudinal seat members 26.

The second transverse member 30 is spaced forwardly of the first transverse member 28 along the pair of longitudinal side members 14, and the pair of longitudinal seat members 26, when pivoted from the folded position to the open horizontal position, pivots into contact with and is supported in cantilevered manner by the second transverse member 30.

Each longitudinal seat member of the pair of longitudinal seat members 26 is separately pivotal upon the first transverse member 28.

Figure 6:
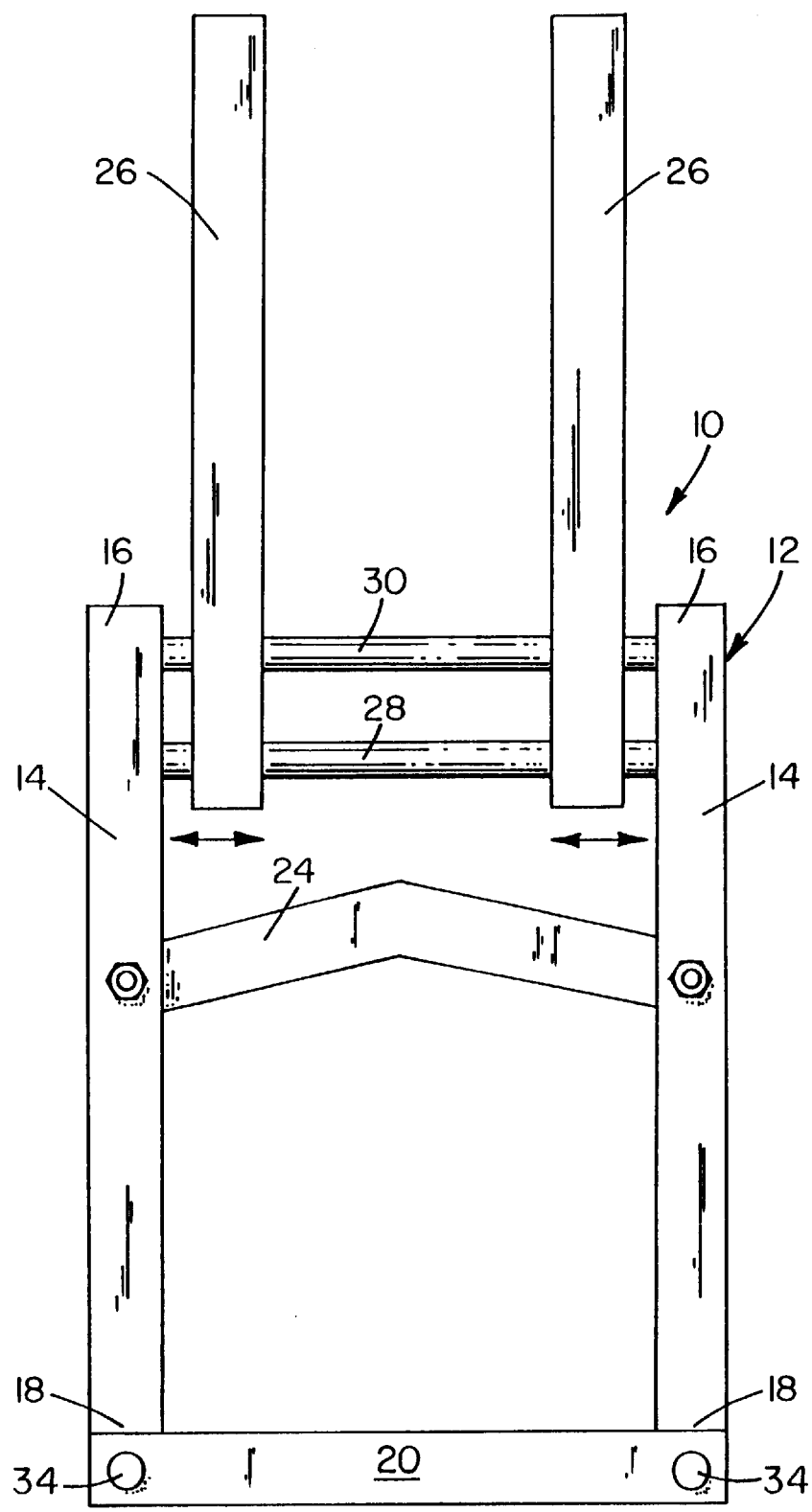
FIG. 6 is a plan view of the toilet apparatus illustrating a lateral adjustment of each of the longitudinal seat members of the pair of longitudinal seat members with respect to each other along the first transverse member.
Figure 7:
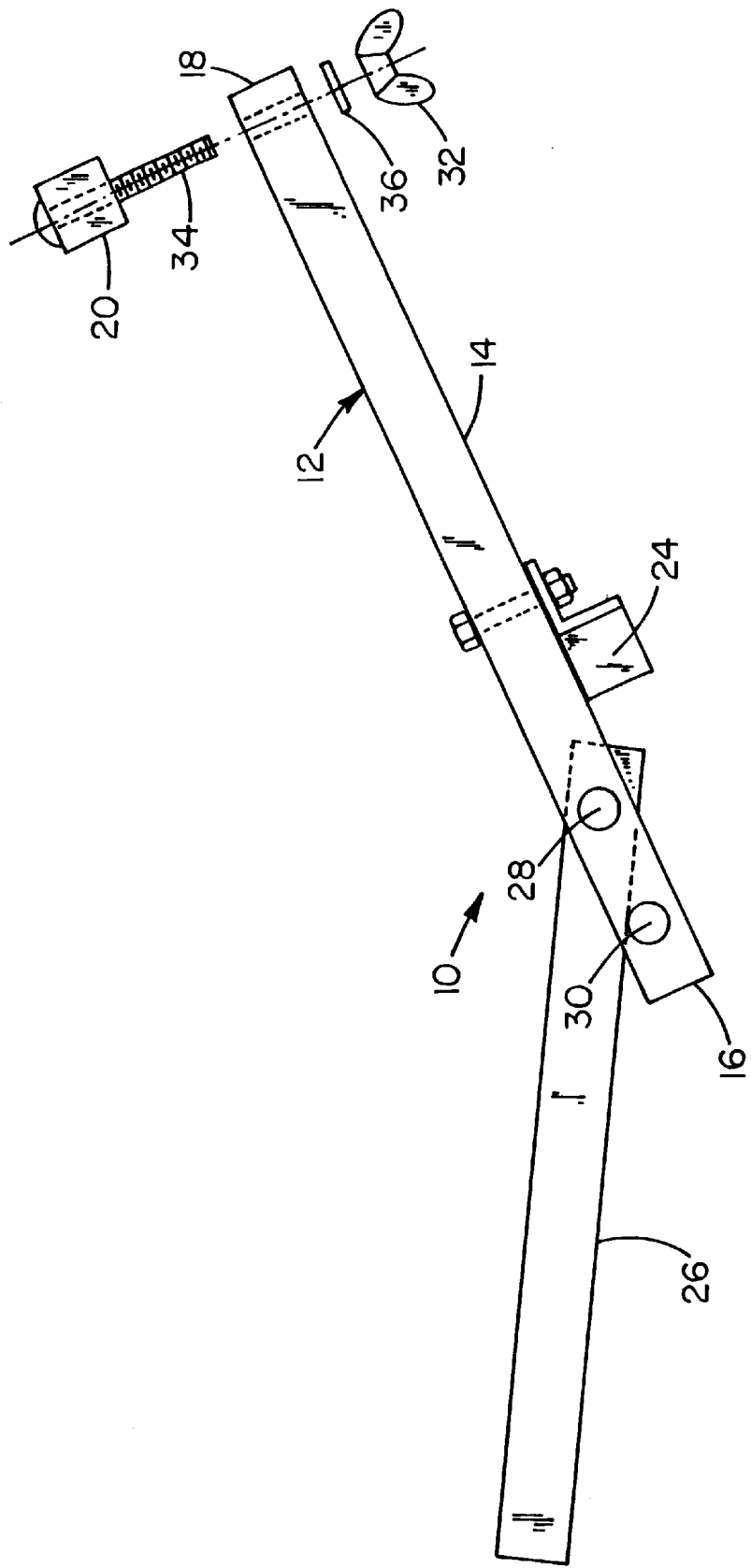
FIG. 7 is a side elevational view of the toilet apparatus and partially exploded at one end to show the threaded screw, washer and wing nut for the removable back bar.

Each longitudinal seat member of the pair of longitudinal seat members 26 is separately laterally adjustable along the length of the first transverse member 28 with respect to the other longitudinal seat member of the pair of longitudinal seat members so as to accommodate children and adults of different size, as illustrated in FIG. 6.

With reference to FIGS. 4 and 5, wherein the toilet apparatus 10 is shown in folded position, the removable back bar 20 is removed from the rearward end portions 18 of the pair of longitudinal side members 14 by removing the wing nuts 32 from the threaded screws 34, and removal of the threaded screws 34 and washers 36 so that the pair of longitudinal seat members 26 may be pivoted from the folded position within the gripping frame section 12 about the first transverse member 28 into the open horizontal position, as shown in FIGS. 1–3, 6 and 7, and into contact with the second transverse member 30 in cantilevered position. The toilet apparatus 10 is attached to a suitable diametered tree trunk 22 so that the pair of longitudinal side members 14 engage on either side of the tree trunk and the front bar 24 is moved into snug engagement against the front side of the tree trunk. The removable back bar 20 is re-attached to and between the rearward end portions 18 of the pair of longitudinal side members 14 by means of the aforementioned threaded screws 34, washers 36 and wing nuts 32, and as shown more specifically in FIG. 7.

As will be observed from FIGS. 1, 2 and 3, the removable back bar 20 of the toilet apparatus 10 engages the back side of the tree trunk 22 at a higher location than the location where the front bar 24 engages the front side of the tree trunk 22.

The front bar 24 is preferably V-shaped in configuration so as to have a wedging action against the front side of the tree trunk 22, but without causing any ecological damage to the tree trunk.

Although the position of the removable back bar 20 with respect to the front bar 24 of the toilet apparatus, when attached to a tree trunk, usually causes the toilet apparatus 10 to remain in the position on the tree trunk where attached, to ensure against downward slippage of the toilet apparatus along the tree trunk when no one is seated upon the toilet apparatus, a flexible elastic tie or strap 38 may be secured around the tree trunk and hooked to the toilet apparatus. Each end of the flexible strap 38 may be provided with a S-shaped hook 40, each of which in turn may be hooked onto the first transverse member 28 while the flexible strap partially encircles the tree trunk.

When it is desired to re-locate to a different tree or location or to pack up and leave the wilderness environment, the removable back bar 20 is removed in the manner previously described, and the pair of longitudinal seat members 26 are pivoted into the folded position within the gripping frame section 12, and then the removable back bar 20 is re-attached in the manner previously described to and between the rearward end portions 18 of the pair of longitudinal side members 14 for ready transport and or storage of the toilet apparatus. Alternatively, if the toilet apparatus is only going to be transported a short distance, it would not be necessary to remove the removable back bar 20, but instead, the pair of longitudinal seat members 26 may be pivoted from the open horizontal position upwardly and rearwardly around the first transverse member 28 until they engage with the top surface of the removable back bar 20. In this manner, the toilet apparatus may be readily transported by simply manually grasping the second transverse member 30.

The pair of longitudinal side members 14, the pair of longitudinal seat members 26, the first and second transverse members 28 and 30, respectively, and the removable back bar 20 are preferably made of reinforced fiber glass, while the V-shaped front bar 24 is preferably made from a metal such as aluminum since it will encounter more possible wear in engaging in wedging manner a tree trunk. The reinforced fiber glass will be less cold to sit on than if the pair of longitudinal seat members were to have been formed from a metal such as aluminum.

As shown in FIG. 2 in phantom lined position, the pair of longitudinal seat members may be folded or pivoted upwardly against the tree trunk 22 when the toilet apparatus 10 is not in use. In this manner the pair of longitudinal seat members will not collect on their upper surfaces any frost or rain, dirt or bird droppings or the like, since the toilet apparatus, once attached to a tree trunk, may remain there for several days or as long as the persons wanting to use same remain in that general location.

A suitable collection bag (not shown) may also be supported from the pair of longitudinal seat members to collect waste matter.

The simplicity of the structure disclosed for the toilet apparatus 10 enables the apparatus to be easily cleaned and/or sanitized. It also presents a very compact structure when in the folded position. It further is a very sturdy structure that will support persons of significant weight, and the ease of lateral adjustment of each longitudinal seat member with respect to the other longitudinal seat member of the pair of longitudinal seat members enables small children to be quickly accommodated as well as to accommodate adults of different size.

The invention has been described in detail with particular reference to a preferred embodiment thereof but it will be understood that variations and modifications can be effected within the spirit and scope of the invention.

I claim:

1. A portable, foldable toilet apparatus for attaching to a tree trunk and comprising:

a tree trunk gripping frame section including:

a) a parallel pair of spaced longitudinal side members having forward and rearward end portions;

b) a removable back bar connected to and between said rearward end portions of said longitudinal side members for engaging against the back side of said tree trunk;

c) a front bar connected to and between said longitudinal side members intermediate of their length and spaced forwardly from said removable back bar for engaging against the front side of said tree trunk; and a pair of longitudinal seat members pivotally connected to said forward end portions of said longitudinal side members for pivotal movement from a folded position within said gripping frame section to an open horizontal position extending forwardly of said gripping frame section for supporting the weight of a person sitting thereon.

2. A portable, foldable toilet apparatus as defined in claim 1, and wherein said gripping frame section includes a first transverse member and a second transverse member connected to and between said longitudinal side members forward of said front bar and each being spaced from the other along said longitudinal side members;

said first transverse member having pivotally connected thereto said pair of longitudinal seat members; and said second transverse member being spaced forwardly of said first transverse member along said longitudinal side members and against which said pair of longitudinal seat members pivot into contact with and is supported in cantilevered manner in said open horizontal position by said second transverse member.

3. A portable, foldable toilet apparatus as defined in claim 2, and wherein each longitudinal seat member of said pair of longitudinal seat members is separately pivotal upon said first transverse member.

4. A portable, foldable toilet apparatus as defined in claim 2, and wherein each longitudinal seat member of said pair of longitudinal seat members is separately adjustable along the length of said first transverse member with respect to the other longitudinal seat member to accommodate persons of different size.

5. A portable, foldable toilet apparatus as defined in claim 1, and wherein upon removal of said removable back bar from said gripping frame section and upon removal of said gripping frame section from said tree trunk, said pair of longitudinal seat members is pivotally moveable from said open horizontal position into said folded position within said gripping frame section and into abutment on one side of said pair of longitudinal seat members against said front bar member, and upon re-attachment of said removable back bar to and between said longitudinal side members, said pair of longitudinal seat members is abutted on the other side of said longitudinal seat members against said removable back bar and is thereby locked into said folded position for ready transport of said toilet apparatus.

6. A portable, foldable toilet apparatus as defined in claim 1, and wherein said pair of longitudinal seat members is foldable upwardly against said tree trunk when said toilet apparatus is attached to the tree trunk and is not in use.

* * * * *